United States Patent [19]
Gurkin

[11] 3,729,768
[45] May 1, 1973

[54] BURNISHING DEVICE FOR ROTARY TELEVISION SET TUNERS' CONTACTS

[76] Inventor: David E. Gurkin, 3165 S.W. 18th Street, Miami, Fla. 33145

[22] Filed: July 6, 1971

[21] Appl. No.: 159,978

[52] U.S. Cl. ....................15/256.51, 200/179, 334/47
[51] Int. Cl. ....................H03j 3/00
[58] Field of Search ....................15/256.51, 222; 200/179; 334/47

[56] References Cited

UNITED STATES PATENTS 3,613,149 10/1971 Gurkin ....................15/256.51

*Primary Examiner*—Leon G. Machlin
*Attorney*—Ernest H. Schmidt

[57] ABSTRACT

A flexible fabric sling-type wiping member is described for application against longitudinally-extending sets of electrical contact points of tuner strips in a rotary drum tuner for wipe cleaning the points as the tuner is rotated during use while changing from channel to channel. A flexible woven fabric is supported in embracing, sling-like fashion over a substantial portion of the periphery of the rotary drum tuner and supported thereat by the tuner drum housing.

5 Claims, 3 Drawing Figures

INVENTOR
DAVID E. GURKIN
BY
Ernest H. Schmidt
ATTORNEY.

BURNISHING DEVICE FOR ROTARY TELEVISION SET TUNERS' CONTACTS

This invention relates to television tuners and is directed particularly to self-cleaning devices for the electrical contacts of rotary drum or barrel television set channel changers or tuners.

Present day television set channel tuners, for the most part, are in the form of rotary drums or barrels having peripherally-spaced, longitudinally-extending tuned strips, one set for each signal channel. Each tuning strip set comprises a tuned circuit for its particular signal channel, circuit connections of which terminate in contact points or buttons along the strip which engage with a corresponding number of resilient, fixed contact arms supported by the tuner housing for electrical interconnection with the remainder of the signal input circuitry for receiving that particular channel. Because the electrical circuits associated with the strips operate at very high frequency signal and oscillator voltages, their circuit parameters are of a very critical nature. For this reason, contact resistance between the switched contact points and their associated fixed contact arms must be kept to an absolute minimum for efficient circuit operation and consequent peak set performance. Notwithstanding measures taken to preserve low contact resistance at the selected tuned strips of such television tuners, however, such as encasing the rotary barrel in a dust-proof cover, utilizing gold or silver-plated contact points and the like, poor contact resistance with attendant impairment of performance is a common disorder of television sets which have been in service for any substantial length of time. Such faulty operation was heretofore cured temporarily by spraying or injecting a contact cleaning fluid into the contact switching mechanism, or by disassembling the tuner and physically cleaning all the various contact points and their associated fixed contact arms.

It is the principal object of this invention to obviate the above-described deficiencies of rotary contact television tuners by the provision of mechanism for automatically wipe-cleaning the contact points of the tuned strips each time the tuner drum is rotated in channel changing during use of the television set. By the use of the wiping mechanism, vapor deposits from the air, dust, oxides and other deposit films are wiped away before they can build up to impair the contact resistance at the tuner switches.

A more particular object is to provide a self-cleaning device for television tuners as herein above described wherein a flexible fabric member is resiliently constrained against a substantial portion of the outer periphery of the tuner drum so as to simultaneously wipe all the contact points of a plurality of tuned strip rows as the tuner is switched from channel to channel during operation of the television set.

Still another object of the invention is to provide a self-cleaning device of the above nature wherein the sling-like contact wiping member serves as a tuner drum enclosing cover, thereby eliminating the need for the usual sheet-metal cover provided with such rotary television set tuners.

Yet another object of this invention is to provide a self-cleaning mechanism for tuners as is herein above described which can readily be applied to existing rotary tuners without difficulty and at minimal expense.

Other objects, features and advantages of the invention will be apparent from the following description when read with reference to the accompanying drawings. In the drawings, wherein like reference numerals denote corresponding parts throughout the several views.

Figure 1:
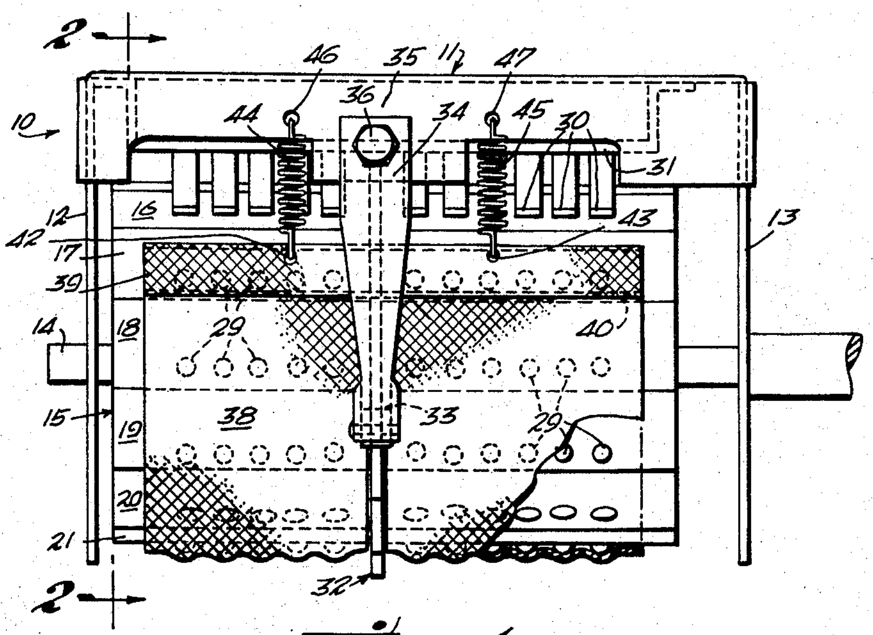
FIG. 1 is an elevational view of a typical rotary drum or barrel television set tuner embodying the invention, with a portion of the sling-like contact wiping member shown broken away to reveal constructional details.

Referring now in detail to the drawings, reference numeral 10 in FIG. 1 designates a typical rotary tuner for television sets, equipped with a self-cleaning device embodying the invention. The tuner assembly 10 comprises a housing structure 11 having spaced, parallel end plates 12 and 13 journalling opposite end portions of a tuner drive shaft 14. The drive shaft 14 carries a rotary tuner drum 15 fitted with a plurality of peripherally-arranged, longitudinally-extending tuned strips 16 through 28 each of which is provided, along its length, with a plurality of aligned contact points 29. The contact point sets 29 of each of the tuned strips 16 through 28 are adapted to switch or make electrical contact with a like plurality of fixed contact arms 30 arranged in a longitudinal row and fixed with respect to the housing structure 11 such as by an insulating support member 31 (see FIG. 2). It will be understood that the contacts of the individual tuned strips 16 through 28 make selective contact with the cooperative fixed contact arms 30 depending upon the rotary position of the rotary tuner drum 15, whereby tuning to the desired reception channel is achieved by turning the drive shaft 14 from one position to another. To this end, mechanical detent means in the form of a circular detent cam 32 is concentrically arranged at a central position along the rotary tuner drum 15, which detent cam is cooperatively engaged about its periphery by a cam follower wheel 33 journalled at the outer end of a cam wheel leaf spring 34. The inner end of the spring 34 is affixed to a sidewall portion 35 of the tuner housing as by a machine screw 36. As best illustrated in FIG. 2, the detent cam 32 is formed about its periphery with a plurality of arcuate recesses 37, equal in number to the number of tuned strips 16 through 28, (13 in the embodiment illustrated), to provide detent or yieldable locking-in of the turned rotary tuner drum 15 at a selected channel position whereat the fixed contact arms 30 are in full contact with the contact points of the corresponding tuned strips.

Figure 2:
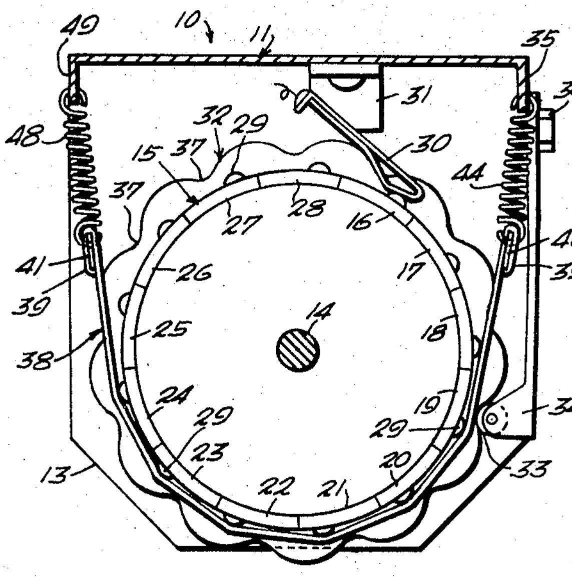
FIG. 2 is a transverse cross-sectional view taken along the line 2—2 of FIG. 1 in the direction of the arrows.

Referring now to the embodiment of the invention illustrated in FIGS. 1 and 2, the self-cleaning device is in the form of a flexible fabric member 38 supported in sling-like embracing relation over a substantial outer peripheral portion of the rotary drum 15 in abutting contact with contact point sets 29 of a plurality of the tuned strips 16 through 28. As means for retaining the fabric member 38 in place, the free ends thereof are hemmed or looped, as indicated at 39, to provide transverse openings for the reception of thin stiffener bars 40, 41. As best illustrated in FIG. 1, the stiffener bar 40 is provided with a pair of through openings 42, 43 symmetrically spaced along its length, through which one end each of a pair of helical tension springs 44, 45, respectively, are interhooked. The other ends of the helical tension spring 43, 45 are hookingly engaged in openings 46, 47 in a sidewall portion 35 of the tuner housing. The stiffener bar 41 is similarly provided with openings for the interhooking reception of springs 48, (only one shown in FIG. 2), the outer ends of which are hookingly interengaged in openings, (not illustrated), provided in a sidewall portion 49 of the tuner housing opposite the sidewall portion 35. The length of the flexible fabric member 38, and the size of the tension springs 44, 45 and 48, are so chosen as to impart a substantial tensional stress along said fabric member so that it firmly embraces a plurality of contact point sets 29 of the tuned strips covered.

In operation, the simultaneous wiping of a plurality of the tuned strip contact sets as the tuner drum is rotated upon channel changing continuously burnishes them to prevent the buildup of contact dirt and films, thereby keeping contact resistance at low values consistant with efficient tuner operation. Since the flexible fabric member 38 encloses a substantial portion of the rotary drum 15, the usual sheet-metal cover plate can be eliminated. If electrical shielding is required, the outer surface of the flexible fabric member can be made electrically conductive such as by metallic deposition, or by the application of a layer or lamina of metal foil, to be grounded to the housing structure 11 through conductive tension springs 44, 45 and 48.

Figure 3:
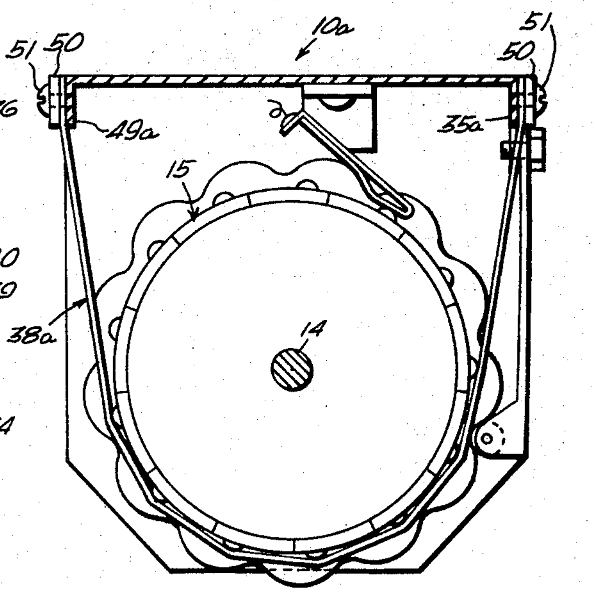
FIG. 3 is a transverse cross-sectional view similar to that of FIG. 2 but illustrating a modified form of the invention wherein the sling-like wiping member is of sufficient elasticity to eliminate the need for separate tensioning springs.

In the embodiment **10*a* of the invention illustrated FIG. 3, the flexible fabric member 38 is made of a resilient or elastic material, so as to be stretchable along its length, and its ends are clamped directly along outside portions of the respective sidewall portions 35*a* and 49*a* of the tuner housing as by the use of clamp bars 50 and machine screws 51. In this embodiment of the invention the flexible fabric material 38*a* is affixed in stressed or stretched relation in its sling-like disposition over the rotary drum 15, thereby eliminating the need of the tension springs 44, 45, and 48 used in the embodiment of the invention illustrated in FIGS. 1 and 2. The operation of the embodiment of the invention illustrated in FIG. 3 is otherwise the same as that described above with reference to the embodiment illustrated in FIGS. 1 and 2. Here again, it will be noted that the flexible fabric member 38*a* almost completely covers the rotary drum 15 and thereby obviates the need of a separate sheet-metal enclosing cover. As in the embodiment of the invention illustrated in FIGS. 1 and 2, if electrical shielding is required in any particular installation, it can be effected by applying an electrically conductive 'ayer to the outside of the flexible fabric member 38*a*, which outer layer would become electrically grounded to the housing structure 11 through the clamp bars 50 and the machine screws 51. It is to be noted that even though the flexible fabric cover member 38 or 38*a* may be electrically conductive for shielding purposes, it is never in contact with the contact sets of the tuned strip connected in the tuner circuit through the fixed contact arms 30**, and therefore cannot interfere with tuner operation.

An important advantage of my invention resides in the fact that it eliminates the need for a separate dust cover in the manufacture of television tuners.

Another important advantage is that in instances of lost or misplaced tuner covers, a frequent occurrence with sets that have been repaired, my flexible fabric sling-type wiping member can be simply and inexpensively substituted, not only to provide dust cover protection, but also to provide self-cleaning action of the rotor contact sets.

While I have illustrated and described herein only two forms in which my invention can conveniently be embodied in practice, it is to be understand that these forms are given by way of example only and not in a limiting sense. The invention, in brief, comprises all the modifications and embodiments coming within the scope and spirit of the following claims.

What I claim as new and desire to secure by Letters Patent is:

1. A contact cleaning device for television tuners of the type comprising a tuner housing member, a rotary drum journalled in said housing member and having peripherally-spaced, longitudinally-extending tuned strips, one set for each channel to be tuned, and a set of resilient contact arms fixed at one end with respect to the tuning housing member and adapted to make selective contact with electrical contact points on the strips as the drum is turned in tuning; comprising, in combination, a flexible fabric wiping member, said flexible fabric wiping member being disposed in sling-like embracing relation over a substantial peripheral outer wall portion of said drum in abutting relation with respect to electrical contact points of said tuned strips, and means for longitudinally resiliently stretching said fabric wiping member in embracing relation with respect to the rotary drum, whereby the contact points of said tuned strips other than those being selectively contacted as the rotary drum is turned during channel changing will be burnished.

2. A contact cleaning device for television tuners as defined in claim 1, wherein the means for resiliently stretching said fabric wiping member comprises a plurality of tension springs interconnecting outer end portions of said fabric wiping member with the tuner housing.

3. A contact cleaning device for television tuners as defined in claim 2, wherein said means for resiliently stretching said fabric wiping member further comprises a stiffener bar secured along each of said outer end portions of said fabric wiping member, said tension springs each having one end thereof secured to one of said stiffener bars and the other end thereof secured to said housing member.

4. A contact cleaning device for television tuners as defined in claim 1 wherein said flexible fabric wiping member is of elastic-like resilience and wherein said resilience comprises said means for resiliently stretching said fabric wiping member in embracing relation with respect to the tuner housing.

5. A contact cleaning device for television tuners as defined in claim 1, wherein the outside of said fabric wiping member is provided with a layer of electrically-conductive material to provide for electrical shielding of the associated tuner.

* * * * *